United States Patent
Hyman

(10) Patent No.: US 10,922,317 B2
(45) Date of Patent: Feb. 16, 2021

(54) SYSTEMS AND METHODS FOR DETERMINING IF A USER IS A MEMBER OF A DEFINED SEGMENT

(71) Applicant: Braze, Inc., New York, NY (US)

(72) Inventor: Jonathan Hyman, New York, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/394,784

(22) Filed: Apr. 25, 2019

(65) Prior Publication Data

US 2020/0341982 A1 Oct. 29, 2020

(51) Int. Cl.
*G06F 16/00* (2019.01)
*G06F 16/2453* (2019.01)
*G06F 16/22* (2019.01)
*G06F 16/23* (2019.01)
*G06F 16/35* (2019.01)

(52) U.S. Cl.
CPC .... *G06F 16/24549* (2019.01); *G06F 16/2228* (2019.01); *G06F 16/2379* (2019.01); *G06F 16/353* (2019.01); *G06F 16/355* (2019.01)

(58) Field of Classification Search
CPC ............... G06Q 50/01; G06Q 30/0204; G06Q 30/0256; G06Q 30/0271; G06Q 30/0269; G06Q 30/0241; G06Q 30/0255; G06F 16/51; G06F 16/24549; G06F 16/435; G06F 16/35; G06F 16/9535; G06F 16/285; Y10S 707/99943
See application file for complete search history.

(56) References Cited

U.S. PATENT DOCUMENTS

| | | | | |
|---|---|---|---|---|
| 7,676,467 B1 * | 3/2010 | Kozyrczak | ............... | G06F 16/90 707/999.006 |
| 8,112,458 B1 * | 2/2012 | Kumar | ................... | G06Q 30/02 707/805 |
| 2006/0248049 A1 * | 11/2006 | Cao | ..................... | G06F 16/3329 |
| 2006/0277585 A1 * | 12/2006 | Error | ..................... | G06Q 30/02 725/112 |
| 2009/0089240 A1 * | 4/2009 | Winter | .................. | G06F 16/283 706/60 |
| 2010/0131517 A1 * | 5/2010 | Huang | .................. | G06F 16/951 707/752 |
| 2010/0318544 A1 * | 12/2010 | Nicolov | ............. | G06Q 30/0202 707/759 |
| 2011/0077998 A1 * | 3/2011 | Yan | ........................ | G06Q 30/02 705/7.29 |
| 2011/0137941 A1 * | 6/2011 | Hoffman | ............. | G06F 16/9535 707/779 |
| 2012/0226559 A1 * | 9/2012 | Baum | ..................... | G06O 30/02 705/14.66 |
| 2012/0278903 A1 * | 11/2012 | Pugh | ..................... | G06F 21/604 726/28 |
| 2013/0191213 A1 * | 7/2013 | Beck | .................. | G06Q 30/0267 705/14.53 |

(Continued)

*Primary Examiner* — Augustine K. Obisesan
(74) *Attorney, Agent, or Firm* — FisherBroyles, LLP

(57) ABSTRACT

Systems and methods for determining whether a user is part of a defined segment of all users makes use of a database of user information that includes rapidly searchable field values. Predetermined segment definitions can be evaluated using information from a user's record in the database to rapidly determine if the user is a member of the segment.

8 Claims, 7 Drawing Sheets

(56) References Cited

U.S. PATENT DOCUMENTS

2015/0095339 A1* 4/2015 Guo ................... G06Q 10/101
707/740
2016/0048885 A1* 2/2016 Chang ............... G06Q 30/0251
705/14.66
2017/0075633 A1* 3/2017 Sawamura ............ G06F 3/121
2017/0357998 A1* 12/2017 Scharf ............... G06Q 30/0277

* cited by examiner

SYSTEMS AND METHODS FOR DETERMINING IF A USER IS A MEMBER OF A DEFINED SEGMENT

BACKGROUND OF THE INVENTION

The invention is related to systems and methods for enhancing customer engagement. In part, this is accomplished by sending messages to customers. The messages could be mobile or browser-based push notifications, text (SMS/MMS) messages, email messages, in-application messages, or an audio recording that is sent to customers via a telephony system.

Another way that customer engagement could be enhanced is via the conduct of an information or advertising campaign. During such a campaign, a series of messages are delivered to a customer over a period of time. Customer actions that occur during the campaign may influence the messages that are sent, or the timing of delivery of the messages.

In the course of sending messages and/or of conducting a campaign, it is often necessary to determine if an individual user is part of a defined segment of all users. For example, one portion of a campaign may involve sending a message to a user if the user makes a purchase from a business, and if the user resides in a particular city. When a user makes a purchase, it is then necessary to determine if the user resides in that city. If so, a message will be sent. If not, no message is sent.

In the past, a database query was performed to determine if the user resides in the subject city. Performing that sort of simple database query is relatively quick. However, as the message trigger rules become more and more complex, the time required to determine if the user is part of a defined segment of users grows longer.

For example, the message trigger could specify that if the user makes a purchase from a business with a value greater than $50, and user has made another purchase within the past 30 days, and the user is a male between the ages of 20 and 40, then message A should be sent if the user resides in location X, message B should be sent if the user resides in location Y, message C should be sent if the user resides in location Z, but no message should be sent if the user does not reside in any of locations X, Y and Z. A second message trigger may also need to be evaluated for users that are female. The second message trigger could specify that if the user makes a purchase from a business with a value greater than $50, and the user has made another purchase within the past 30 days, and the user is a female between the ages of 15 and 30, then message D should be sent if the user resides in location X, message E should be sent if the user resides in location Y, message F should be sent if the user resides in location Z, but no message should be sent if the user does not reside in any of locations X, Y and Z. When a system is attempting to determine which, if any, message should be sent, it might be necessary to run the first query only to find that the user is not male, then run the second query, before a decision can be made about which, if any, message should be sent.

Performing database queries as outlined above, to determine whether the user is a member of any of the identified segments, can be quite time consuming. The time required to make the determination becomes more and more problematic as the number of such determinations that must be made daily rises. Similarly, as the number of users in the user information databases rise, the speed at which such queries can be performed goes down.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers, and how and when to conduct advertising or information campaigns.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future.

Figure 1:
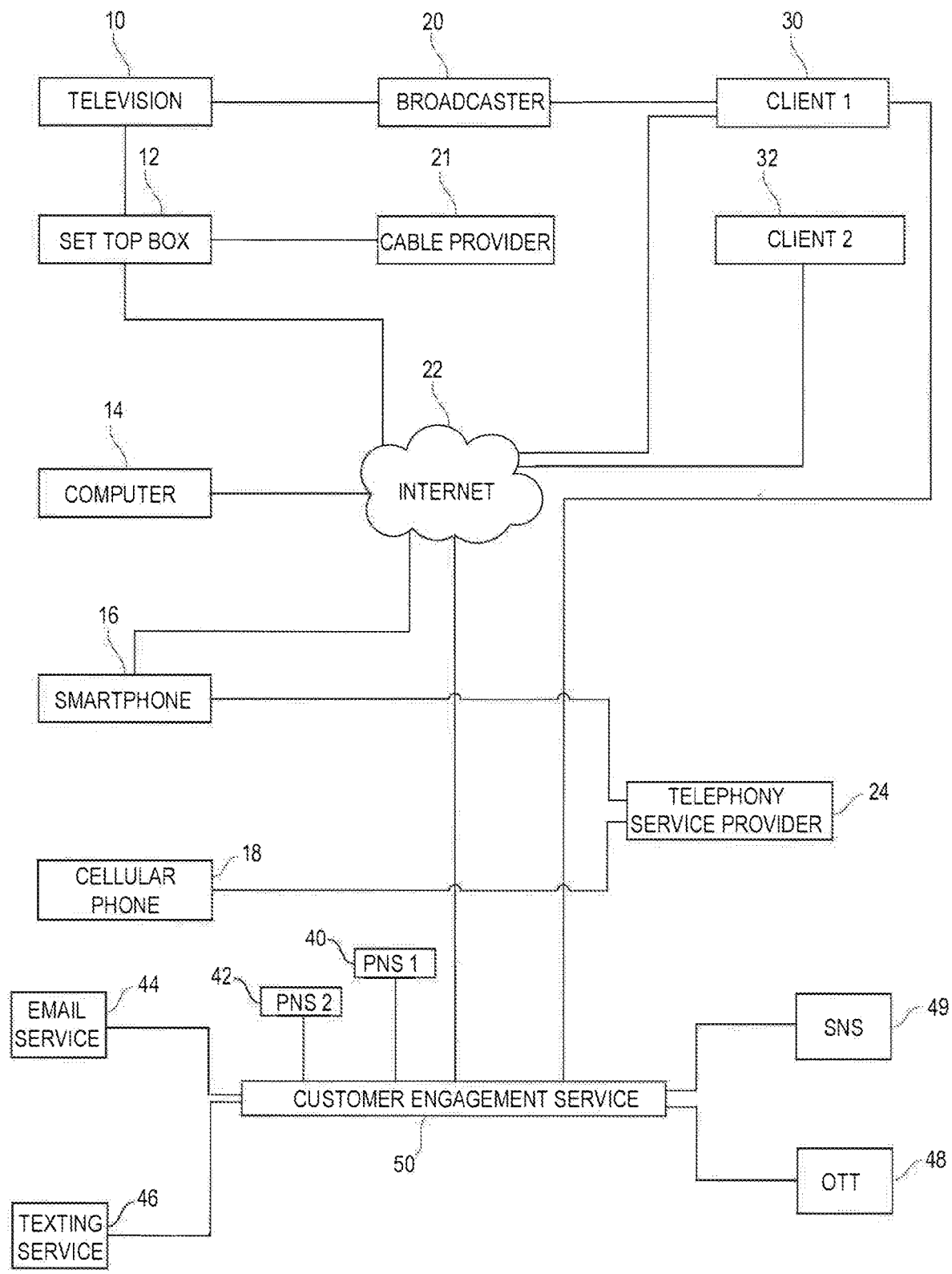
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users or conduct advertising or informational campaigns could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

As noted above, a customer engagement service can help a client to control and orchestrate the delivery of messages to the client's users. One of the ways that this is done is by facilitating the conduct of a "campaign."

Campaigns can take many different forms. Often a campaign will involve orchestrating the delivery of multiple messages to a client's users, typically over a certain period of time. The customer engagement service can help to ensure that the messages are delivered according to a certain sequence and/or according to a certain timing rules and/or according to client defined message delivery rules. For example, the customer engagement service can help to ensure that the second message in the advertising campaign is not sent to a user until the user has reviewed the first message in the campaign.

Similarly, the campaign might be structured such that a message in a campaign is not sent to a user unless the user first takes a specified action, such as making a purchase from the client who requested the conduct of the campaign. In another example, a campaign might be structured such that a message is not delivered to a user until the user has watched a certain video program or movie. The message delivery rules associated with the message can be simple or quite complex.

For example, the message delivery rule could be as simple as requiring that every time a user makes a purchase, the user is sent a certain message. That rule could apply to all of the client's users.

On the other hand, as mentioned in the Background section, the delivery rules associated with a message can be quite complex. Often the delivery rules specify that any users that are members of a first segment are to receive a first message, whereas any users that are members of a second segment are to receive a second message. The message delivery rules can include further requirements that also must be met before a message is sent to a user. For example, the message delivery rules may further state that a message is only to be sent if the user makes a purchase having a value greater than a predetermined threshold value.

In the message delivery rule mentioned above, the first segment could be males and the second segment could be females. Determining whether a particular user is a member of the first segment (males) or the second segment (females) would be relatively quick and easy.

However, the definitions of the first and second segments could be considerably more complex. For example, the first segment could be defined as males between the ages of 20 and 40, who reside in a particular city, who have purchased something from the client within the last year and who have opened and used the client's software application within the last month. Determining whether a particular user is a member of that segment is considerably harder and more time consuming.

The systems and methods described and claimed below are designed to very rapidly determine if a particular user is a member of a defined segment of all of a client's users. Often the determination can be made in microseconds, even in instances where the segment definition is quite complex.

A segment definition could be based, in whole or in part, on user characteristics, such as gender, age, residence location, last known location, income level, or any of many other user characteristics.

A segment definition can also be based on user behavior, such as whether a user has or has not taken a particular action. For example, a segment definition could be based on whether a user has ever made a purchase from a client. Another example would be whether a user has ever used a client's software application.

Actions used to define a segment may be time limited in certain ways. For example, a segment definition could be based on whether a user has made a purchase within the last thirty days. A segment definition might also be based on whether the user has used a client's software application within the last seven days.

In some instances, a segment definition also may be based on a value that must be determined or calculated. For example, a segment could be defined based on whether a user has spent more than $500 total with the client. In order to determine whether a user is a member of that segment, it would be necessary to track the user's purchases over time and constantly update the total amount that the user has spent.

A segment definition might also be based on multiple values, some or all of which may be obtained from a database of user information, and some or all of which are calculated. For example, all users that have opened a client's software application more than seven times in the last seven days. Or all users that have watched fewer than 10 television episodes over the last 5 days.

A segment definition may be based on user behavior that occurred in response to receiving one or more messages previously sent to the user. For example, all users that opened an email from a certain messaging campaign. In these types of behavioral based segment definitions, the user's responses to prior messaging can be generic in nature, or tied to specific messages. For example, the segment definition could be users that have failed to open the last five messages that were sent to the user. Or users that failed to open a specific message that was previously sent to the user.

In another example of a segment defined based on user behavior, a segment may be defined as all users that spend more than an average of 10 minutes per day on a client's website.

A segment may also be based on the characteristics of user equipment and the software used on that equipment. For example, a segment may be defined as all users that have the iOS operating system on their mobile device. Or a segment may be defined as all users that have a certain version of a software program in use on their computing device.

Machine learning and artificial intelligence techniques that identify user propensities can also be used to help setup segment definitions. For example, machine learning and/or artificial intelligence techniques may be able to predict that a user prefers email messages over push notifications or in-application messages. The individual signals used to make this propensity determination are not important to the segment definition. Instead, machine learning techniques and artificial intelligence techniques would be used to monitor a large number of different signals, and them simply make a user propensity prediction, such as that a user prefers email messages over push notifications or in-application messages. Once that user propensity determination has been made, a segment can be defined as all users that prefer email messages to push notifications or in-application messages.

While a customer engagement service may be responsible for facilitating the delivery of messages for a client, and conducting a campaign for a client, it is typically the client that specifies how and when messages are to be sent to the client's users. When a segment is used to determine whether a message should be sent to a user, or to determine which users are to receive certain messages, it is typically the client that is defining the segments. It is then up to the customer engagement service to determine whether a particular user is a member of the client defined segment.

The ways that segments are defined will vary from client to client, depending on the nature of the clients themselves. The above-discussed examples that relate to money that a user has spent would be relevant and useful for clients who are retailing operations.

If a client is a media company, a segment might be based on whether a user has watched any media content provided by the client within the last seven days. A segment might also be based on whether a user has watched a particular program, show or movie provided by the media company client.

As should be apparent, the way in which a client defines segments will largely be dictated by the nature of the client and what the client finds interesting or indicative of user desires or preferences. A factor that a first client in a first business finds helpful in defining a segment may have no applicability whatsoever to a second client that is in a completely different business.

The foregoing was merely intended to introduce the concept of defining a segment. Additional details about segments and systems and methods for determining whether a user is a member of a defined segment are provided below.

Figure 2:
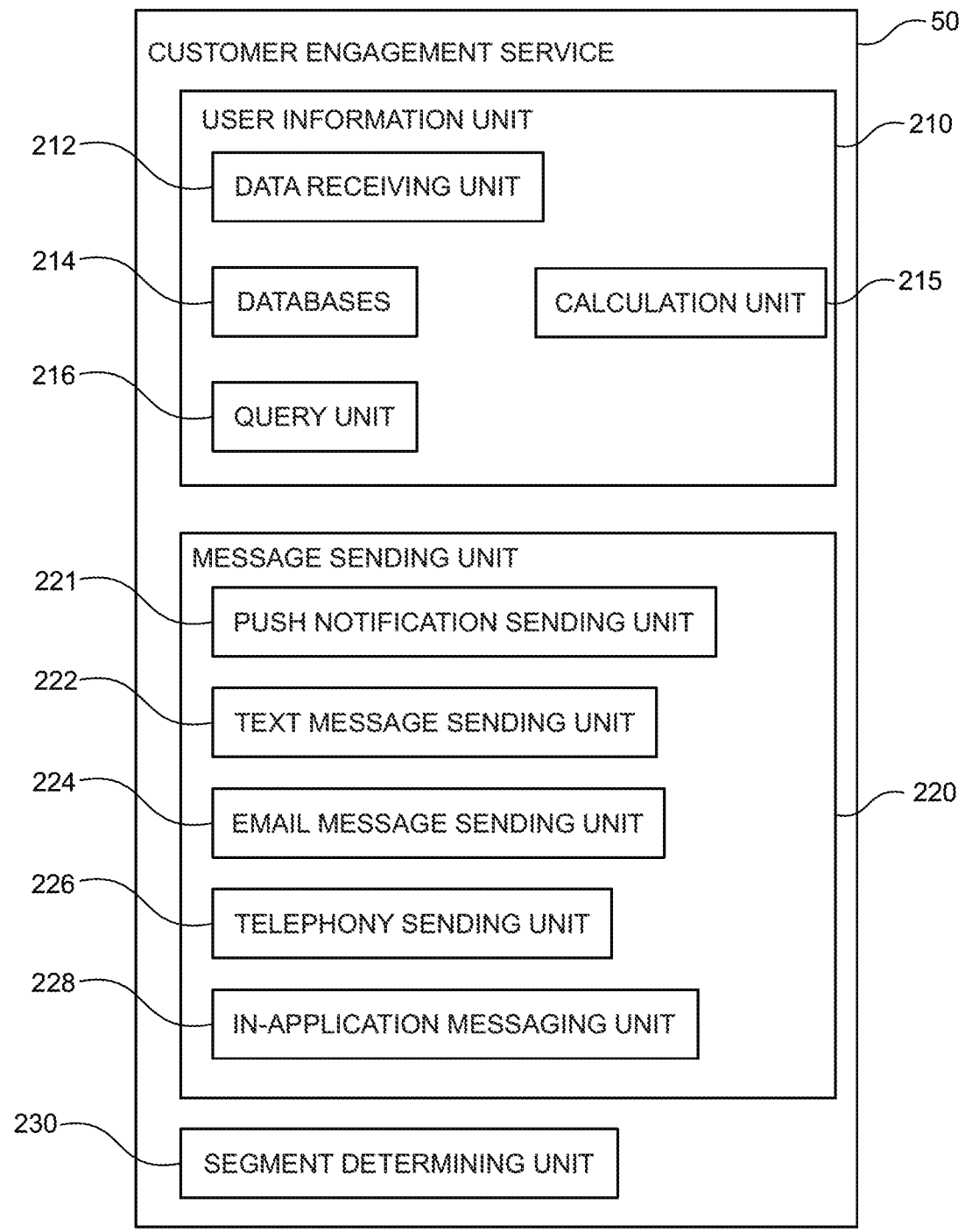
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

The information stored in the user databases can include user characteristics and demographic data, information about user behavior or activity, as well as calculated or derived values. For example, the information stored in the user databases could include user propensity determinations that have been made based on data calculations or using machine learning and/or artificial intelligence techniques. Because clients vary, the information stored in the user information databases will vary from client to client. An online retailer will likely wish to store information about user purchases. A media company will likely wish to store information about the content that each user watches. Thus, the user information databases will store and track different items, depending on the nature of the clients.

Typically, a database of user information that is maintained for a client will include a different record for each of the client's users. However, in some circumstances, multiple user information databases may be maintained for a single client. If multiple user information databases are maintained for a single client, a first databases may include records for a first subset of the client's users, and additional databases of user information may include records for other subsets of the client's users. In other instances, multiple user information databases may be maintained for a client, and each of those databases may include records for all of the client's users. However, each of the multiple databases could be dedicated to storing different types of information about the users.

Once a user information database has been created for a client, the user information unit 210 will seek to add data to the user information database whenever possible. This can include add information to the fields of a user's record in the database when new information is received via the data receiving unit 212, and also updating information in various fields of a user's record. For example, a field of a user's record that tracks the last time that the user made a purchase from the client will be updated with a new purchase date each time the user makes a purchase.

In many instances, the information received by the data receiving unit 212 and which is stored in the databases 214 will come from the client. For example, a client may send notifications to the data receiving unit 212 each time that one of the client's users engages with the client in some fashion. If the client is an online retailer, each time that a user makes a purchase from the online retailer, the online retailer could send the data about the purchase made by that user to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action. Also, the information in the databases 214 is updated in real time, or near real time, as new information is received.

Because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after a user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

The user information unit 210 also includes a calculation unit 215, which periodically calculates or updates the values stored in some fields of the user information databases 214. In many instances, new calculations are performed as soon as new information is received, and the newly calculated information is immediately stored in the user databases. Thus, the process of calculating information to be stored in user databases occurs in real time, or near-real time. This calculation and update process will be described in detail below.

As shown in FIG. 2, the user information unit 210 also includes a query unit 216. The query unit 216 queries the databases 214 to obtain various items of information about the users.

More detail about the creation of user information databases, and how the user information databases are updated is provided below in connection with descriptions of methods embodying the invention.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to users via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a message to the users.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing messages to be delivered to a user via a client's software application that it provides to its users. For this reason, the in-application messaging unit 228 can interact with an instantiation of a client's software application that is resident on a user's computing device.

The customer engagement service 50 also includes a segment determining unit 230, which is responsible for determining whether a particular user is part of a defined segment of users. Details of how the segment determining unit 230 operates are provided below in connection with FIGS. 3-6.

Figure 3:
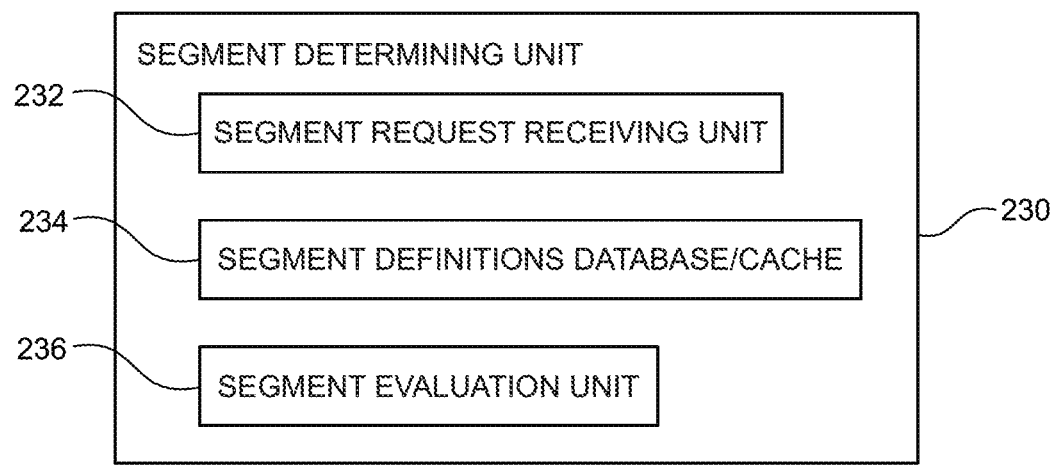
FIG. 3 is a diagram illustrating selected elements of a segment determining unit that may be a part of a customer engagement service.

FIG. 3 depicts some elements of a segment determining unit 230. A segment request receiving unit 232 receives information from a client that defines a segment of the client's users. In some instances, the client may pre-define segments that the client intends to use to control delivery of messages. A segment definition could be used to identify a group of users that are to receive a particular message when the same message is to be sent to multiple users. Also, a segment definition could be used in connection with a campaign. In this case, the segment definition is used to determine whether a user that has taken a certain action is a member of a defined segment, which then dictates whether the user should receive a particular message.

In instances where the client has set up a campaign, the client may specify that when a user takes a certain action, the customer engagement service should send the user a message if the user is a member of a defined segment. Thus, the segment request receiving unit 232 may receive client defined segment information in connection with the setup and operation of the campaign.

In instances where the client provides segment definitions, the segment definition can be stored in a segment definitions database or cache 234. Placing the segment definitions in a memory cache allows for very rapid retrieval and use of the segment definitions when it is necessary to determine if a particular user is a member of a defined segment, as discussed in more detail below.

A segment evaluation unit 236 is responsible for determining whether a user is a member of a segment. The segment evaluation unit 236 uses a segment definition and information in the user databases 214 to determine if the user is a member of the defined segment. The segment evaluation unit 236 may retrieve a segment definition from the segment definitions database or cache 234 to help make that determination.

Figure 4:
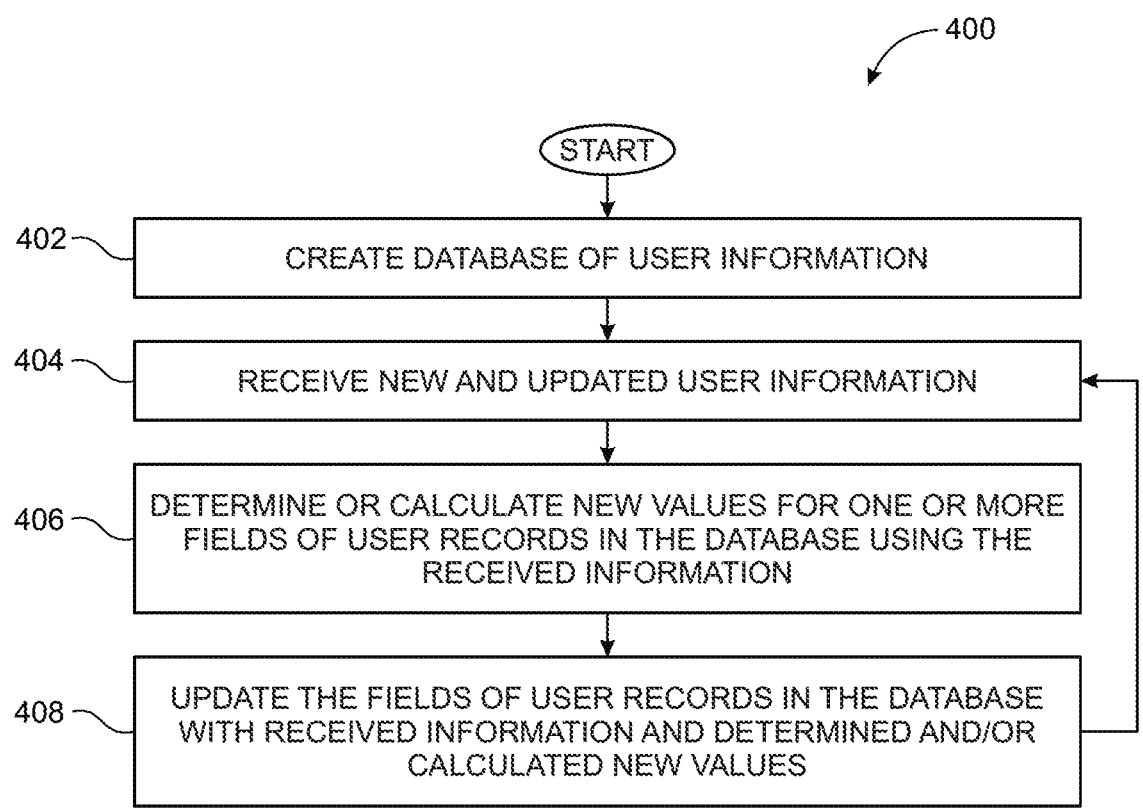
FIG. 4 is a diagram illustrating steps of a method of creating and updating one or more databases of user information.

We now turn to a description of methods embodying the invention relating to the setup and maintenance of user information databases, as depicted in FIG. 4. The user information databases could be part of the databases 214 that are maintained by the customer engagement service 50. Alternatively, the user information databases could be setup and maintained by a client, or by a third party. The information in these user information databases is configured and maintained in such a way that the segment evaluation unit 236 can use the information in the databases to very rapidly determine if a user is part of a defined segment of a client's users.

The method 400 begins and proceeds to step 402, where a database of user information is created. Each record of the database is for an individual user. The fields of each user's record contain information about the user's characteristics and demographics, information about his behavior, and possibly calculated values which relate to the user of the user's behavior.

In a traditional database of user information, the fields might contain the user's name, his address, his date of birth, his income, and various other characteristic and demographic information. However, the user information database created in step 402 also has additional fields which are designed to allow the segment evaluation unit 236 to quickly determine if the user is a member of a defined segment of all users.

For example, rather than only including a field for the user's date of birth, there may also be three fields in each user's record that cover age ranges. A first age range field would be for ages 10-17, a second age range field would be for ages 18-35, and a third age range field would be for ages 36-100. These age range fields would carry a True/False value or a Yes/No value. When a user's record in the database is first created, the user's date of birth would be used to determine which of the age range fields to mark as "True" or "Yes," and the other two age range fields would be marked "False" or "No."

Similarly, instead of only having a field for the user's income, the user information database might have three income level fields. A first income level field would be for an annual income of $0-$40,000, a second income level field would be for an annual income of $40,001-$99,999 and a third income level field would be for an annual income of $100,000 or more. When the user's record in the database is first created, the appropriate income level field would be marked "True" or "Yes" and the other two income level fields would be marked "False" or "No."

The user information database may also include fields that contain information regarding user behavior. For example, if the client provides its users with a software application, one field in each user's record in the database may contain the date that the user last ran the client's software application. However, the user information database created in step 402 also includes date of last use fields for various time frames. A first field may be for last use within the past three days, a second field might be for last use within the last ten days, a third field may be for last use within the past thirty days, and a fourth field may be for last use more than thirty days ago. When the user's record is created in the database, the appropriate one of fields may be marked "True" or "Yes" and the other three fields would be marked "False" or "No." If no information is yet available about the date the user last used the client's software application, all four fields would initially be marked "False" or "No."

As another example, if the client was an online retailer, the user records in the database might include a first field that indicates the total amount the user has spent with the online retailer, and a second field that indicates the total amount the user has spent with the online retailer over the last twelve months. However, the records of the database might also include several range fields for purchases over the last twelve months. A first field would be for purchases totaling $0-$19.99 over the last twelve months, a second field would be for purchases totaling $20-$99.99 over the last twelve months, and a third field would be for purchases of $100 or more over the last twelve months.

The inclusion of range fields in the records of the user information database allow for the segment evaluation unit 236 to very rapidly query the information in a user's record to determine if the user is part of a defined segment in the database. For example, if the segment evaluation unit 236 needed to determine of a user was a member of a segment that is users between the ages of 18 and 35, who have used the client's software application within the last three days and who have spent more than $100 with the client within the last 12 months, the segment evaluation unit 236 could simply check the user's record to see of the three corresponding range fields in the user's record all have a value of "True" or "Yes." If so, the user is a member of the defined segment. If not, the user is not a member of the defined segment.

Conducting an evaluation as outlined above, by checking three True/False fields, is much more rapid than if the segment evaluation unit 236 were forced to: (1) obtain the user's date of birth, and then perform a calculation to determine if the user is within the age range 18 to 35; (2) obtain the date that the user last used the client's software application, and then perform calculations to determine if that date is within the last three days; and (3) obtain the total amount that the user has spent over the last 12 months, and perform a calculation to determine if that amount is greater than $100.

Of course the same basic segment determination could be made in other ways. For example, instead of having range fields for the items listed above, the fields in the user database could instead store calculated or updated values. For example, the fields in the user database could include an age field that provides the user's current age, a date of last use field that stores the date that the user last opened the client's software application and a spent amount field that indicates the total amount spent by the user. Under these circumstances, the query used to determine if the user is a member of the defined segment would be whether the user's age is greater than or equal to 18 and less than or equal to 35, whether the date of last use is less than or equal to three days ago, and whether the user's total spent amount is greater than $100.

Returning now to the method depicted in FIG. 4, once a user information database has been created in step 402, and the fields of each user's record have been populated with an initial set of data, the method proceeds to step 404, where new or updated information about the user's characteristics or behavior is received. As explained above, the client will be constantly feeding information about client actions, activity and interactions to the data receiving unit 212 of the user information unit 210. Also, the data receiving unit 212 may be receiving information about user activity from one or more software applications that the client has provided to its users. The data receiving unit 212 may also be receiving such information from various third-party sources.

When a new piece of information about a user is received, the method proceeds to step 406, which is an optional step, where new field values for one or more of the fields of the user's record are determined or calculated. For example, if the new information received in step 404 indicates that a user made a purchase from the client for a total of $75, step 406 could involve: (1) calculating the new number to be stored in the field that indicates the total amount that the user has spent with the client; (2) calculating the new number to be stored in the field that indicates the amount the user has spent over the last 12 month; and (3) determining new true/false field values to be stored in the fields that indicate the user's sending ranges over the last 12 month.

The method then proceeds to step 408, where the fields of the user's record in the user information database are updated with any new information received in step 404 or any new field values that were calculated or determined in step 406. The method then loops back to step 404, where new and updated user information is received. Steps 404, 406 and 408 would thereafter be repeated, again and again, as new information is received. The concept is to constantly update the user information database in real time, or near real time, as new information is received.

Figure 5:
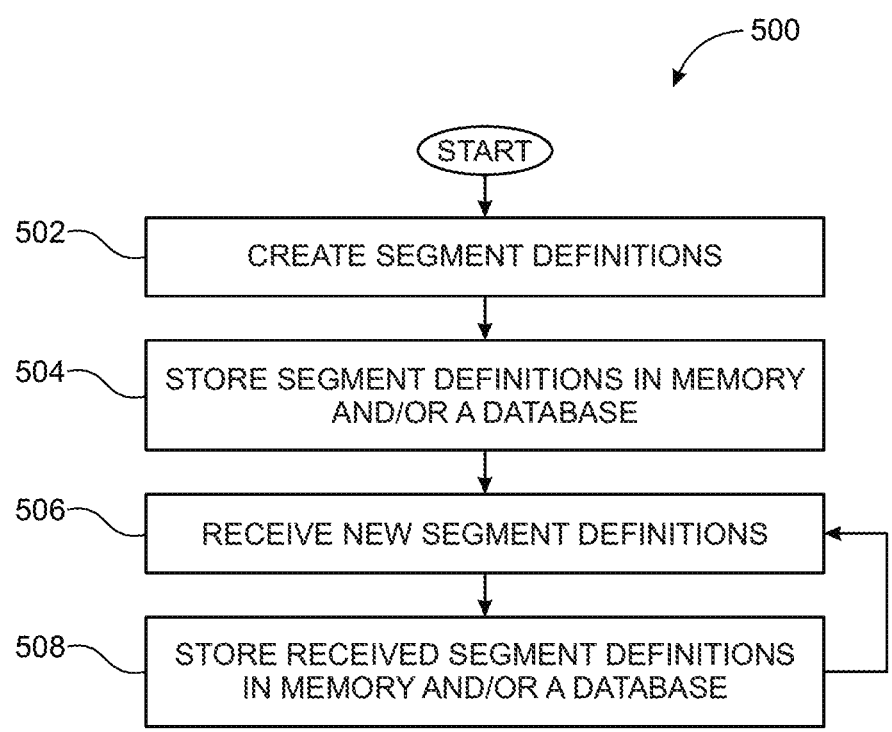
FIG. 5 is a flowchart illustrating steps of a method of creating and storing segment definitions.

FIG. 5 depicts a method of creating and storing segment definitions so that those segment definitions can be used to quickly determine if a particular user is a member of a defined segment. The method 500 begins and proceeds to step 502 where segment definitions are created. The client itself may create segment definitions that it finds interesting or helpful in its business. In addition, the customer engagement service 50 may provide a set of segment definitions that it believes may be helpful or interesting to the client. In step 504, the segment definitions created in step 502 are stored in a database and/or in a memory cache 234.

Over time, the client and/or the customer engagement service 50 create additional segment definitions, as new needs arise, and those new segment definitions are received by a segment request receiving unit 232 of a segment determining unit 230 in step 506. In step 508, the new segment definitions received in step 506 are stored in a database and/or in a memory cache 234. The method then loops back to step 506, and steps 506 and 508 continuously repeat.

The segment definitions could be expressed in various different ways. One way is via the use of a boolean expression that incorporates fields of the user information database created in the method depicted in FIG. 4.

Assume that a desired segment is males in the age range 18-35 who have opened the client's software application within the last 3 days and who have spent more than $100 total with the client. Assume that the field name for user's gender is "gender", that the field name for the age range 18 to 35 is "age_18_35", that the field name for the use of the software application within the last three days is "use_3" and that the field name for total amount spent by the user is "$_spent". Under these circumstances, the segment definition could be the boolean expression "gender=M AND age_18_35=T AND use_3=T AND $_spent>100".

This segment definition would be saved in a database or a memory cache 234. Any time the segment evaluation unit 236 needs to determine if a particular user is a member of that segment, the segment evaluation unit 236 could obtain this boolean expression and then determine if the data in the fields of the user's record satisfy the boolean expression. The segment evaluation unit 236 could use the boolean expression corresponding to the segment definition to get a very quick yes/no answer about whether the user is a member of the segment.

Figure 6:
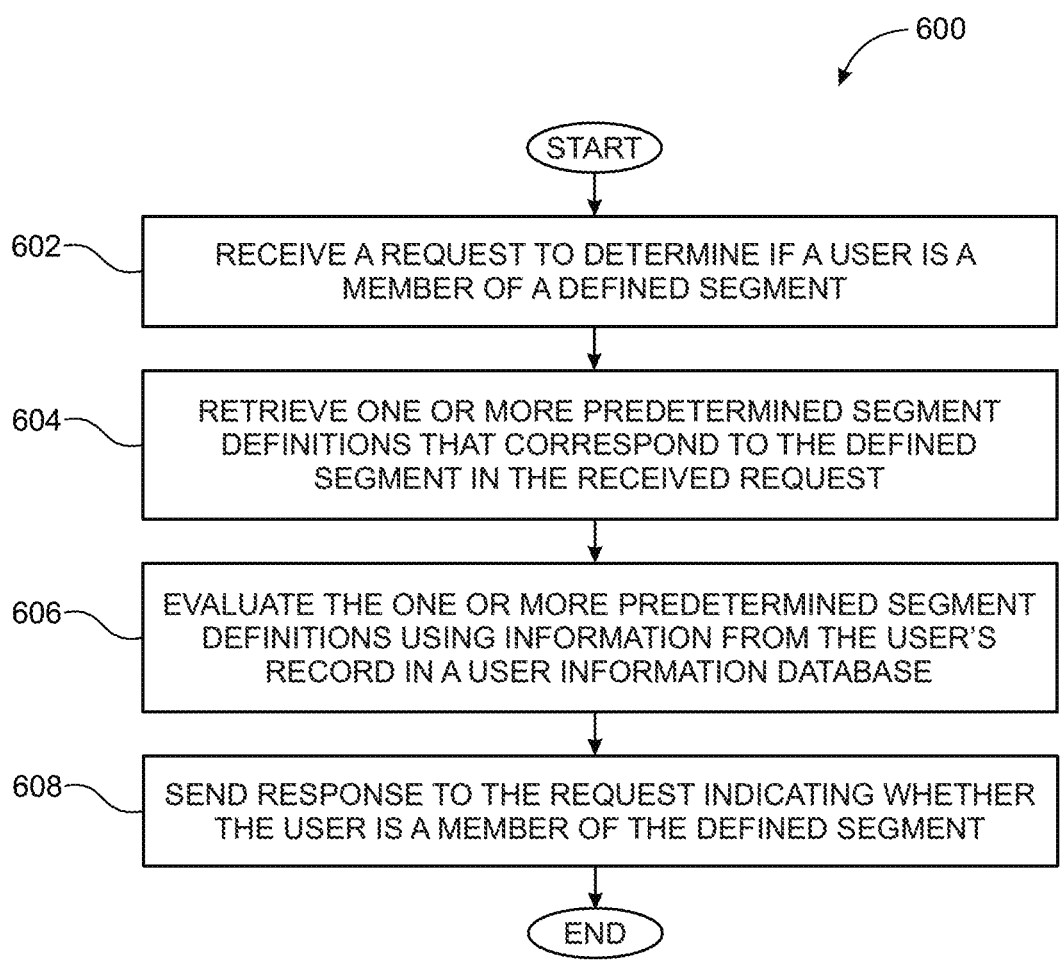
FIG. 6 is a flowchart illustrating steps of a method of determining whether a user is a member of a segment of users.

FIG. 6 illustrates steps of a method of determining whether a user is a member of a segment. The method 600 begins and proceeds to step 602, where the segment evaluation unit 236 of a segment determining unit 230 receives a request to determine if a user is a member of a defined segment.

In some instances, the request itself will include a segment definition, such as the boolean expression described above, that can be used to make the determination. In other instances, in step 604 the segment evaluation unit 236 obtains or retrieves one or more predetermined segment definitions that correspond to the segment identified in the request received in step 602. There may be a complete predetermined segment definition, like the boolean expression described above, stored in the segment definitions database or cache 234 that fully corresponds to the segment identified in the request received in step 602. In other instances, the segment evaluation unit 236 may construct a complete segment definition that corresponds to the segment identified in the request using two or more predetermined segment definitions stored in the segment definitions database or cache 234. In still other instances, it may be necessary for the segment evaluation unit 236 to construct a new segment definition, in the form of a boolean expression as described above, that corresponds to the segment identified in the request.

The method then proceeds to step 606, where the segment definition ultimately obtained or created by the segment evaluation unit 236 is evaluated using information in the fields of the user's record in the user information database to determine if the user is a member of the segment. In step 608 a response is sent to the party that made the initial request to inform that party about whether the user is a member of the segment. The method then ends.

The fields of a user information database embodying the invention include the types of range fields discussed above that contain True/False or Yes/No values. Similarly, the user information database can contain pre-computed values that are also very easy to check or test with a boolean expression. By configuring the user information database in this fashion, and then using boolean expressions that correspond to segments as described above, it becomes possible to very quickly determine whether a user is a member of a particular segment.

The ways that a client wishes to identify segments dictates how the client's user information database should be configured. If the client wishes to identify users in the age ranges 10-17, 18-35 and 36 or older, then it is necessary to setup the user information database so that each record includes those three date range fields, where the date range fields can have True/False or Yes/No values. If a second client wishes to use other date ranges, then the second client's user information database will have different age range fields in each user record.

Similarly, a first client that is an online retailer may be interested in tracking the amount of money spent by its users. Thus, that first client's user information database will have fields that track amounts spent, and possibly fields with ranges of amounts spent, as described above. A second client that is a media company may wish to track the amount of time that users spend watching the client's media content. Thus, the second client's user information database will have different fields to track the time users spend watching media content.

While the design and configuration of the user information databases will vary from client to client, the important point is that each client's user information database will be configured to include fields that can be easily and rapidly checked with a boolean expression, as described above, to determine if the user is a member of a defined segment.

Also, the way in which a client wishes to define segments is likely to change over time. Clients will often create new segments and re-define segments to achieve new business goals. Because the client's user information database must be configured to allow for easy testing of whether an individual user is a member of a segment, it likely will be necessary to add new fields to a client's user information database as new segments are defined.

In systems and methods embodying the invention, the segment definitions themselves may be cached to that they need not be recreated each time. Over time, a library of different segment definitions can be built up and retrieved for use.

In some embodiments, the boolean logic expression that defines a segment may be evaluated in a way that speeds a determination of whether a user is a member of the segment. For example, if some parts of the boolean logic expression are known to exclude large portions of the population, those parts of the boolean logic expression may be evaluated first. As soon as the evaluation of one part of the expression indicates that the user is not a member of the segment, the evaluation for that user can cease and the user as the user has been determined to not be a member of the segment.

For example, if the boolean expression defines a segment that is users between the ages of 18 and 40 who live in Denmark, it makes sense to first check if the user lives in Denmark, as that will exclude the majority of all users.

Because some parts of a boolean expression can rapidly indicate that a user is not part of the defined segment, the process of evaluating a boolean expression defining the segment can include decomposing the boolean expression into its component parts, and then sorting the component parts into a preferred evaluation order. The component parts that are most likely to exclude a user from the segment are evaluated first. This can result in a rapid determination that the user is not a member of the defined segment, making evaluation of the remaining components of the boolean expression unnecessary.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 7:
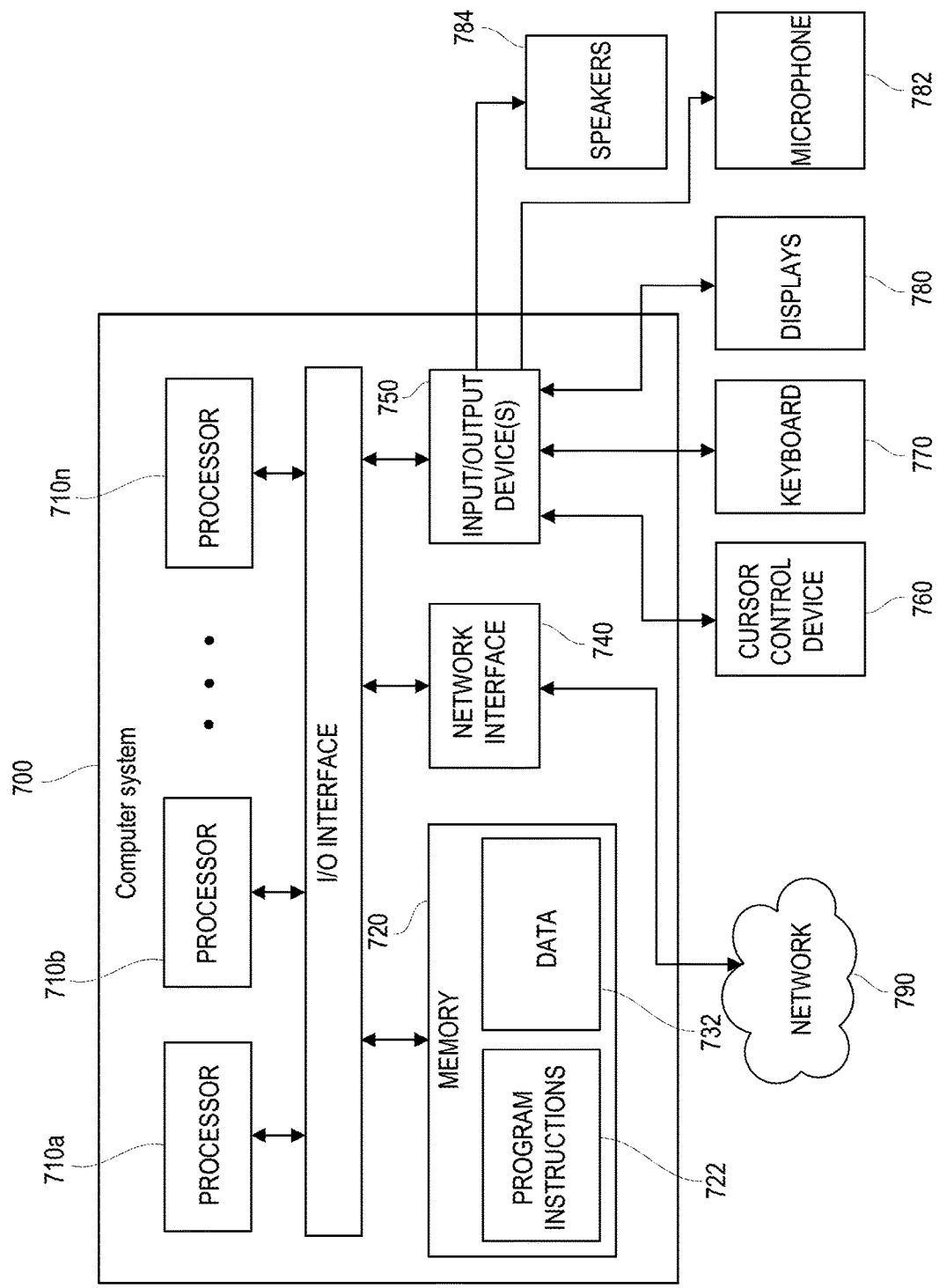
FIG. 7 is a diagram of a computer system and associated peripherals which could embody the invention, or which could be used to practice methods embodying the invention.

FIG. 7 depicts a computer system 700 that can be utilized in various embodiments of the present invention to implement the invention according to one or more embodiments. The various embodiments as described herein may be executed on one or more computer systems, which may interact with various other devices. One such computer system is the computer system 700 illustrated in FIG. 7. The computer system 700 may be configured to implement the methods described above. The computer system 700 may be used to implement any other system, device, element, functionality or method of the above-described embodiments. In the illustrated embodiments, the computer system 700 may be configured to implement the disclosed methods as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, display(s) 780, microphone 782 and speakers 784. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, the computer system 700 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the operations and methods described above, such as the methods illustrated by the flowcharts of FIGS. 4-6. In other embodiments, different elements and data may be included.

Those skilled in the art will appreciate that the computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of determining whether a user is member of a segment of users comprising a plurality of predetermined segment definitions, comprising:

creating a database that includes a plurality of records, where each record includes a plurality of fields for storing information about a single user's characteristics and behavior;

populating the fields of the database records with any available information about the characteristics and/or behavior of the corresponding users;

creating and storing a plurality of predetermined segment definitions, where each predetermined segment definition can be evaluated using data stored in one or more of the fields of a user's database record to determine if the user is a member of the segment;

updating the information in the fields of the users' database records as new information about the users' characteristics and/or behavior is received;

ordering selected ones of the plurality of predetermined segment definitions based on predetermined criteria to generate a segment definition comprising the selected ones of the plurality of predetermined segment definitions; and determining, upon request, if a user is a member of the segment definition comprising the selected ones of the plurality of predetermined segment definitions by evaluating each of the selected ones of the plurality of predetermined segment definitions in the sequence in which they are ordered using information in the user's database record, wherein evaluation of the selected ones of the plurality of predetermined segment definitions is halted when evaluation of one of the predetermined segment definitions excludes the user from the segment definition comprising the selected ones of the plurality of predetermined segment definitions.

2. The method of claim 1, wherein the predetermined criteria is the degree to which each of the selected ones of the predetermined segment definitions is likely to exclude a user from the segment definition comprising the selected ones of the plurality of predetermined segment definitions, and the selected ones of the predetermined segment definitions are ordered such that those of the predetermined segment definitions that are most likely to exclude a user from the segment definition comprising the selected ones of the plurality of predetermined segment definitions are evaluated first.

3. The method of claim 1, wherein the segment definition comprising the selected ones of the plurality of predetermined segment definitions is a boolean expression that can be evaluated using information from multiple fields of the user's database record.

4. The method of claim 1, wherein the predetermined segment definitions overlap such that a single user can be a member of multiple predetermined segments.

5. A system comprising one or more processors that is configured to determine whether a user is member of a segment of users, the system comprising:
 a user information unit that creates a database that includes a plurality of records, where each record includes a plurality of fields for storing information about a single user's characteristics and behavior, that populates the fields of the database records with any available information about the characteristics and/or behavior of the corresponding users, and that updates the information in the fields of the users' database records as new information about the users' characteristics and/or behavior is received; and
 a segment determining unit comprising:
  a segment definitions database or cache that stores a plurality of predetermined segment definitions, where each predetermined segment definition can be evaluated using data stored in one or more of the fields of a user's database record to determine if the user is a member of the segment, and
  a segment evaluation unit that determines, upon request, if a user is a member of a segment definition that is comprised of selected ones of the plurality of predetermined segment definitions by ordering the selected ones of the plurality of predetermined segment definitions of the segment definition comprising the selected ones of the plurality of predetermined segment definitions based on predetermined criteria, and by evaluating the selected ones of the plurality of predetermined segment definitions in the sequence in which they are ordered using information in the user's database record, wherein evaluation of the plurality of predetermined segment definitions is halted when evaluation of one of the predetermined segment definitions excludes the user from the segment definition comprising the selected ones of the plurality of predetermined segment definitions.

6. The system of claim 5, wherein the predetermined criteria is the degree to which each predetermined segment definition is likely to exclude a user from the segment defintion comprising the selected ones of the plurality of predetermined segment definitions, and the segment evaluation unit orders the selected ones of the plurality of predetermined segment definitions such that those of the predetermined segment definitions that are most likely to exclude a user from the segment definition comprising the selected ones of the plurality of predetermined segment definitions are evaluated first.

7. The system of claim 5, wherein the segment definition comprising the selected ones of the plurality of predetermined segment definitions is a boolean expression that can be evaluated using information from multiple fields of the user's database record.

8. The system of claim 5, wherein the predetermined segment definitions overlap such that a single user can be a member of multiple predetermined segments.

\* \* \* \* \*